United States Patent
Viscardi

(10) Patent No.: US 11,446,732 B2
(45) Date of Patent: *Sep. 20, 2022

(54) RIVETING APPARATUS FOR ASSEMBLY PLANTS

(71) Applicant: COSBERG S.P.A., Terno d'Isola (IT)

(72) Inventor: Gianluigi Carlo Viscardi, Bergamo (IT)

(73) Assignee: COSBERG S.P.A., Terno d'sola (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/312,217

(22) PCT Filed: Nov. 28, 2019

(86) PCT No.: PCT/IB2019/060281
§ 371 (c)(1),
(2) Date: Jun. 9, 2021

(87) PCT Pub. No.: WO2020/121102
PCT Pub. Date: Jun. 18, 2020

(65) Prior Publication Data
US 2022/0048095 A1   Feb. 17, 2022

(30) Foreign Application Priority Data

Dec. 14, 2018 (IT) .................. 102018000011097

(51) Int. Cl.
*B21J 15/02* (2006.01)
*B21J 15/12* (2006.01)
(Continued)

(52) U.S. Cl.
CPC .............. *B21J 15/02* (2013.01); *B21J 15/12* (2013.01); *B21J 15/14* (2013.01); *B21J 15/26* (2013.01); *B21J 15/32* (2013.01)

(58) Field of Classification Search
CPC ... B21J 15/12; B21J 15/26; B21J 15/14; B21J 15/30; B21J 15/02; B21J 15/04; B21J 15/10; B21J 15/32
See application file for complete search history.

(56) References Cited

U.S. PATENT DOCUMENTS

| 6,108,896 A * | 8/2000 | Gignac | B21J 15/142 901/41 |
| 2016/0184881 A1* | 6/2016 | Pang | B21J 15/32 29/281.5 |
| 2019/0134699 A1* | 5/2019 | Inagaki | B21J 15/44 |

FOREIGN PATENT DOCUMENTS

| DE | 102005047191 A1 | 4/2007 |
| WO | 2017157926 A1 | 9/2017 |
| WO | 2018029563 A1 | 2/2018 |

OTHER PUBLICATIONS

International Search Report, issued in PCT/IB2019/060281, dated Mar. 23, 2020, Rijswijk, Netherlands.

(Continued)

*Primary Examiner* — Matthew P Travers
(74) *Attorney, Agent, or Firm* — Ferguson Case Orr Paterson

(57) ABSTRACT

A riveting apparatus for application and riveting a rivet to a component of an article being processed in a work region of the riveting apparatus is provided. The riveting apparatus includes a rivet insertion device for insertion of the rivet into the component and a riveting device for the riveting of the rivet.

3 Claims, 19 Drawing Sheets

(51) Int. Cl.
*B21J 15/26* (2006.01)
*B21J 15/32* (2006.01)
*B21J 15/14* (2006.01)

(56) References Cited

OTHER PUBLICATIONS

Written Opinion, issued in PCT/IB2019/060281, dated Mar. 23, 2020.
Italian Search Report, issued in 201800011097, dated Sep. 10, 2019.

* cited by examiner

RIVETING APPARATUS FOR ASSEMBLY PLANTS

CROSS-REFERENCE TO RELATED APPLICATIONS

This application is a National Phase Application of PCT International Application No. PCT/IB2019/060281, having an International Filing Date of Nov. 28, 2019 which claims the benefit of priority to Italian Patent Application No. 102018000011097, filed Dec. 14, 2018, each of which is hereby incorporated by reference in its entirety.

FIELD OF THE INVENTION

The object of the present invention is a riveting apparatus for assembly plants, for example for multicomponent articles, such as hinges.

BACKGROUND OF THE INVENTION

In the field of assembly plants of articles, it is essential that the machines are able to produce large volumes in a short time. Only in the presence of these features, in fact, the system cost can be amortized in a short time and the investment can be profitable.

In the field of the manufacture of machines for such plants, therefore, there is a tendency to create ever faster lines, sometimes able to produce tens of thousands of articles a day. It is however essential to minimise waste and obtain articles having optimal functionality.

This is even more evident in the case of assembly of multicomponent articles, in which the components are intended for relative movements, as is the case with hinges, for example for windows and doors, furniture, appliances and the like.

SUMMARY OF THE INVENTION

The object of the present invention is to provide a riveting apparatus that meets the needs of the sector.

Such an object is achieved by a riveting apparatus as described and claimed herein. Alternative embodiments are also described.

BRIEF DESCRIPTION OF THE DRAWINGS

The features and the advantages of the riveting apparatus according to the present invention will appear more clearly from the following description, made by way of an indicative and non-limiting example with reference to the following figures, in which.

DETAILED DESCRIPTION

Figure 1A:
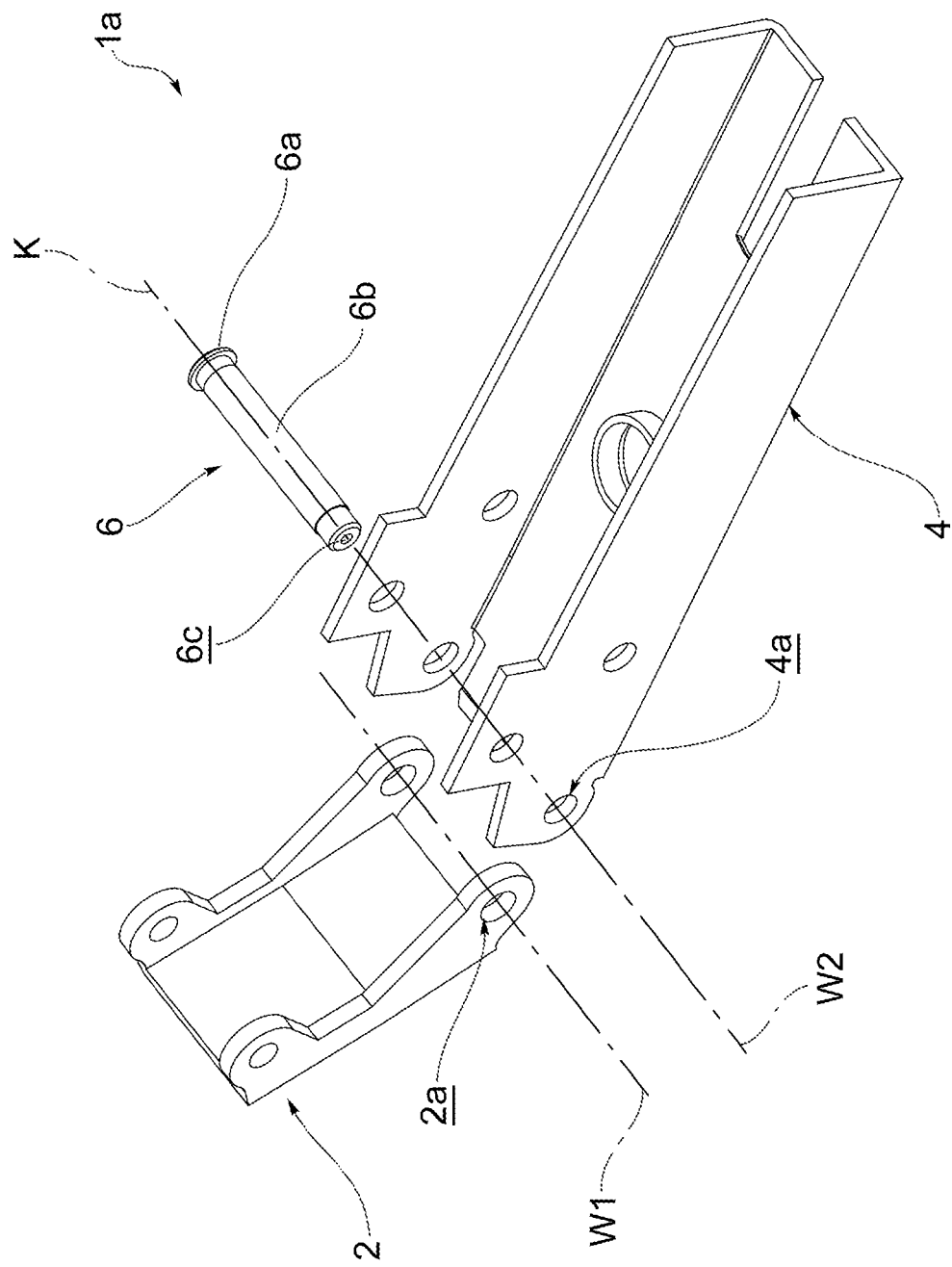
FIG. 1a shows a multicomponent article to be riveted and assembled, such as a hinge; the article does not in itself constitute an object of the present invention.

With reference to the example in FIG. 1a, reference numeral 1a denotes as a whole a multicomponent article to be assembled, for example a hinge, comprising a first component 2 provided with a first through hole 2a having a first hole axis W1, a second component 4 provided with a second through hole 4a having a second hole axis W2, and a rivet 6 intended to be inserted in the aligned holes 2a, 4a and engage the first and the second component, thus hinging them.

According to an exemplary embodiment, rivet 6 consists of a head 6a to be riveted, i.e. to be plastically deformed, a shank 6b, protruding from the head along a rivet axis K, having a slit 6c a the free end thereof.

Figure 1B:
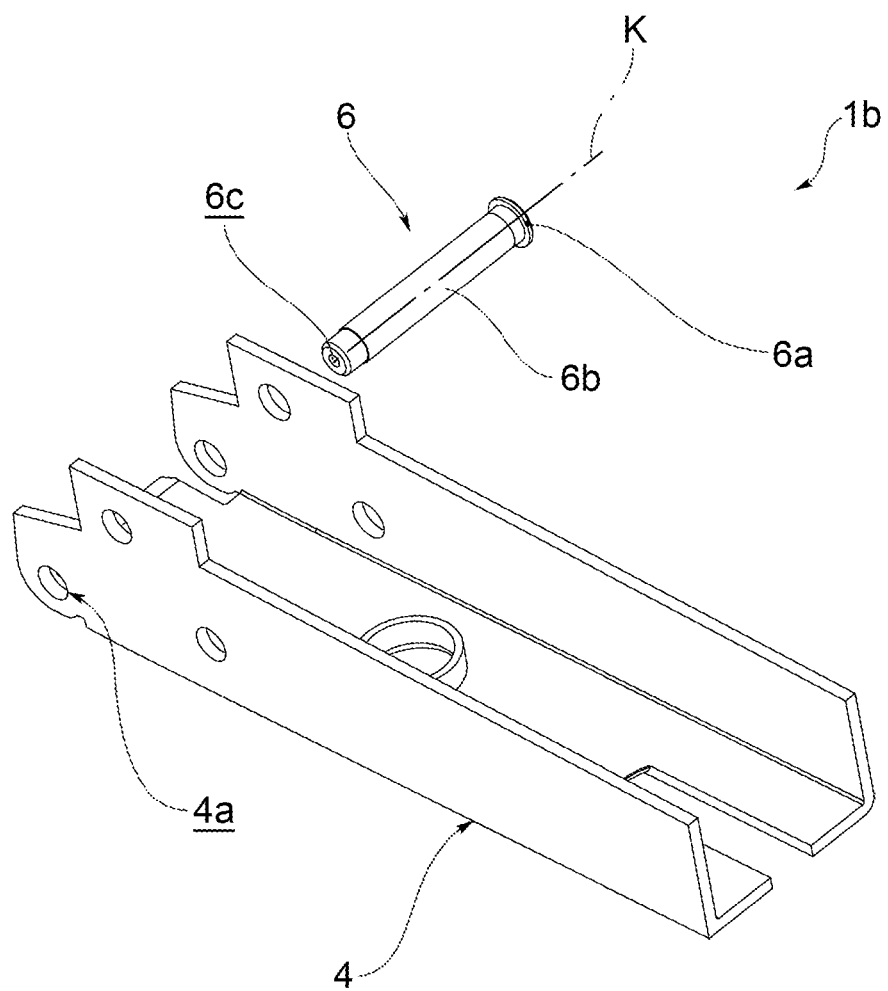
FIG. 1b shows an article to be riveted; the article does not in itself constitute an object of the present invention.

FIG. 1b shows a further example of article 1b to be riveted, consisting of component 4 provided with the through hole 4a, to be riveted through rivet 6 intended to be inserted into hole 4a.

Figure 2A:
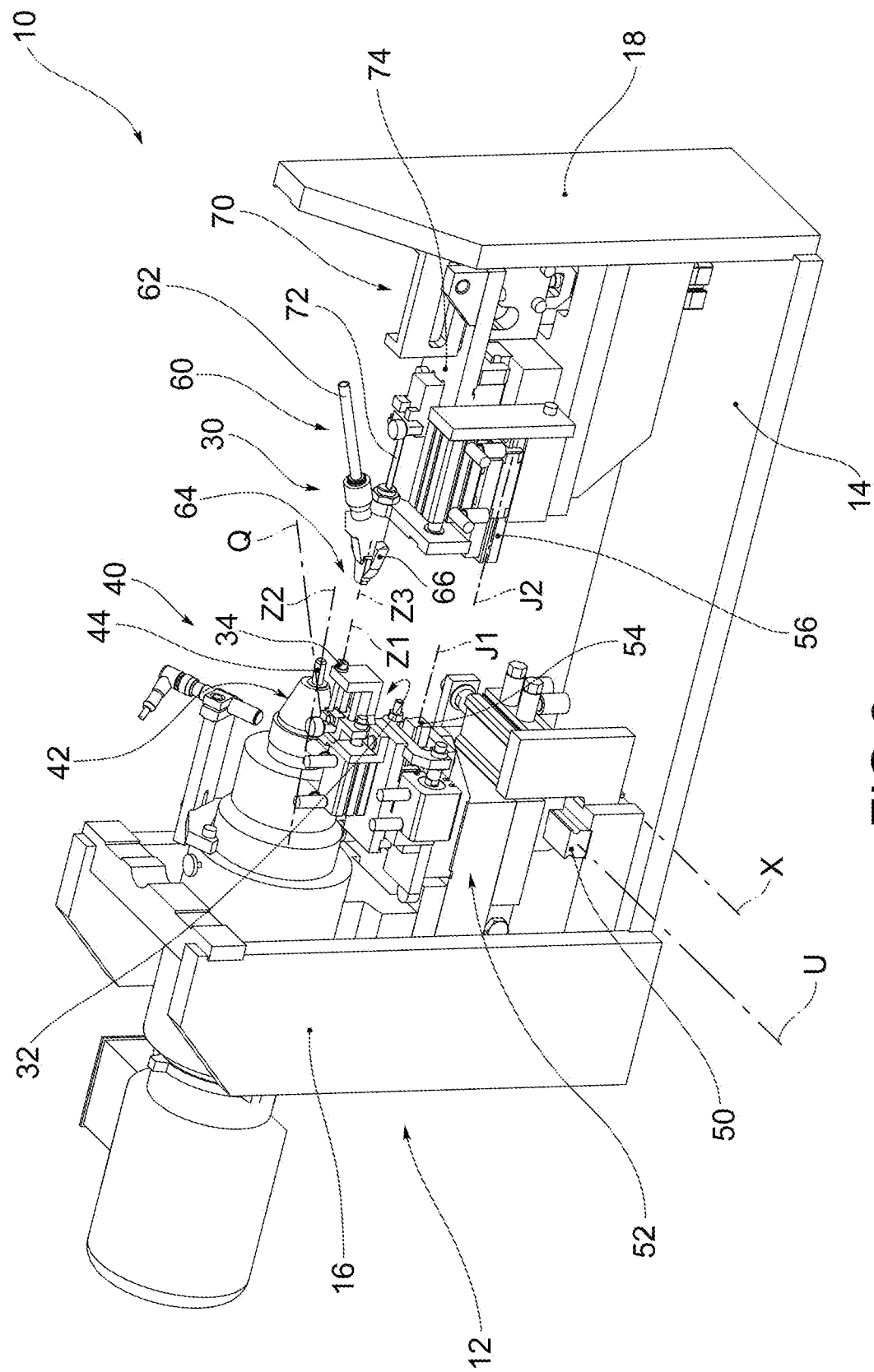
FIGS. 2a and 2b show a riveting apparatus according to an embodiment.
Figure 2B:
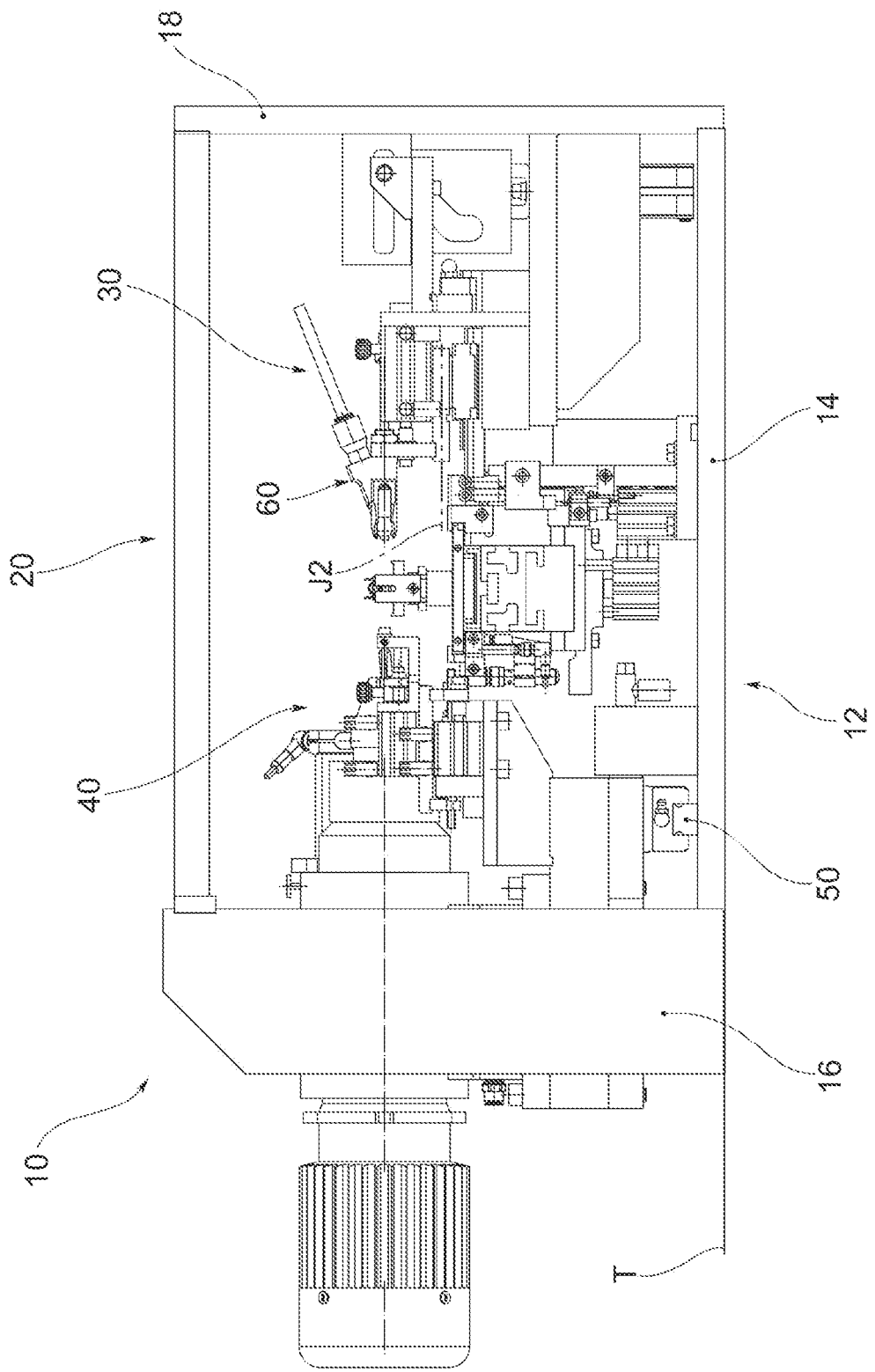
Figure 3:
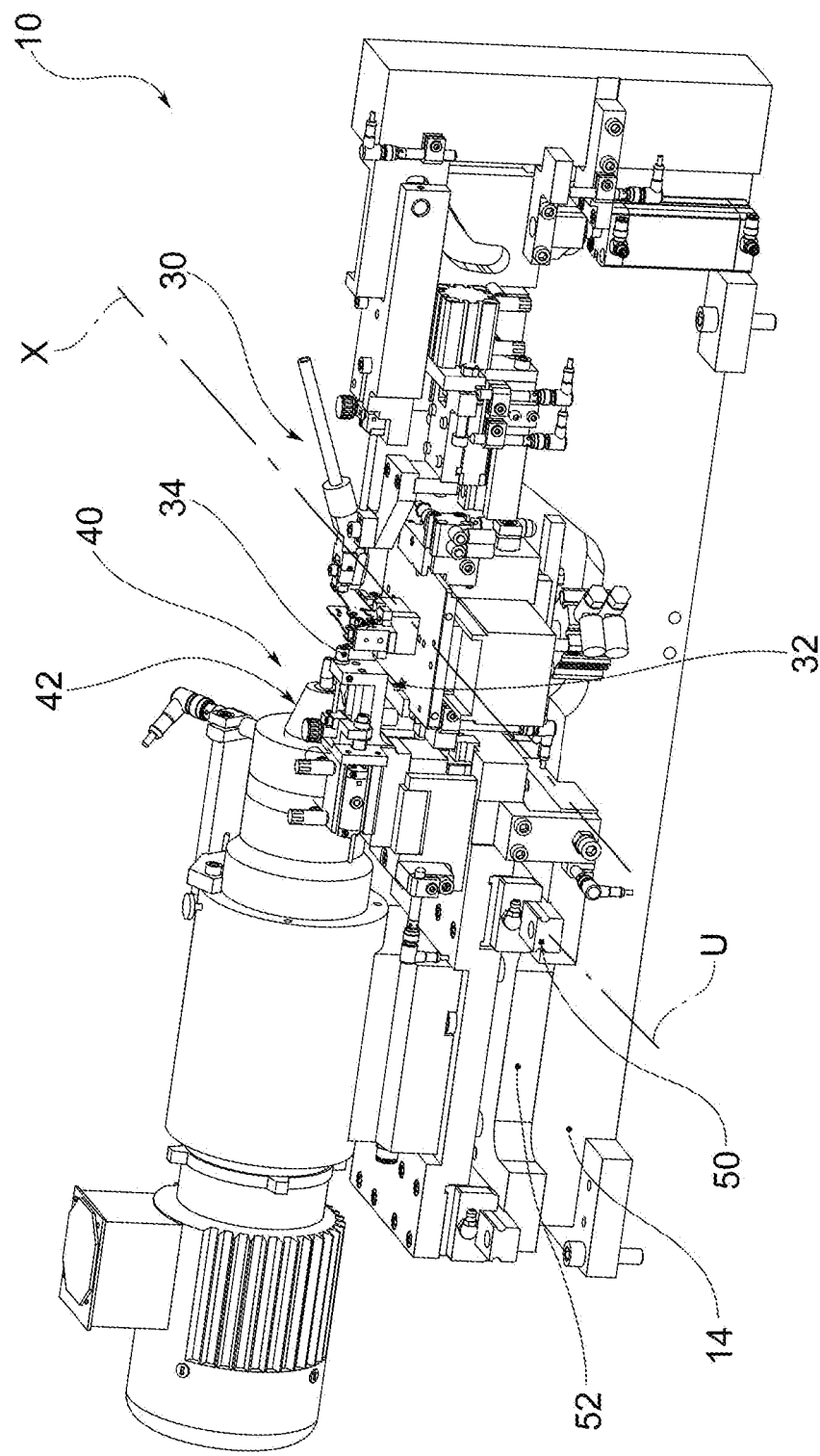
FIG. 3 shows a riveting apparatus according to a further embodiment.
Figure 4:
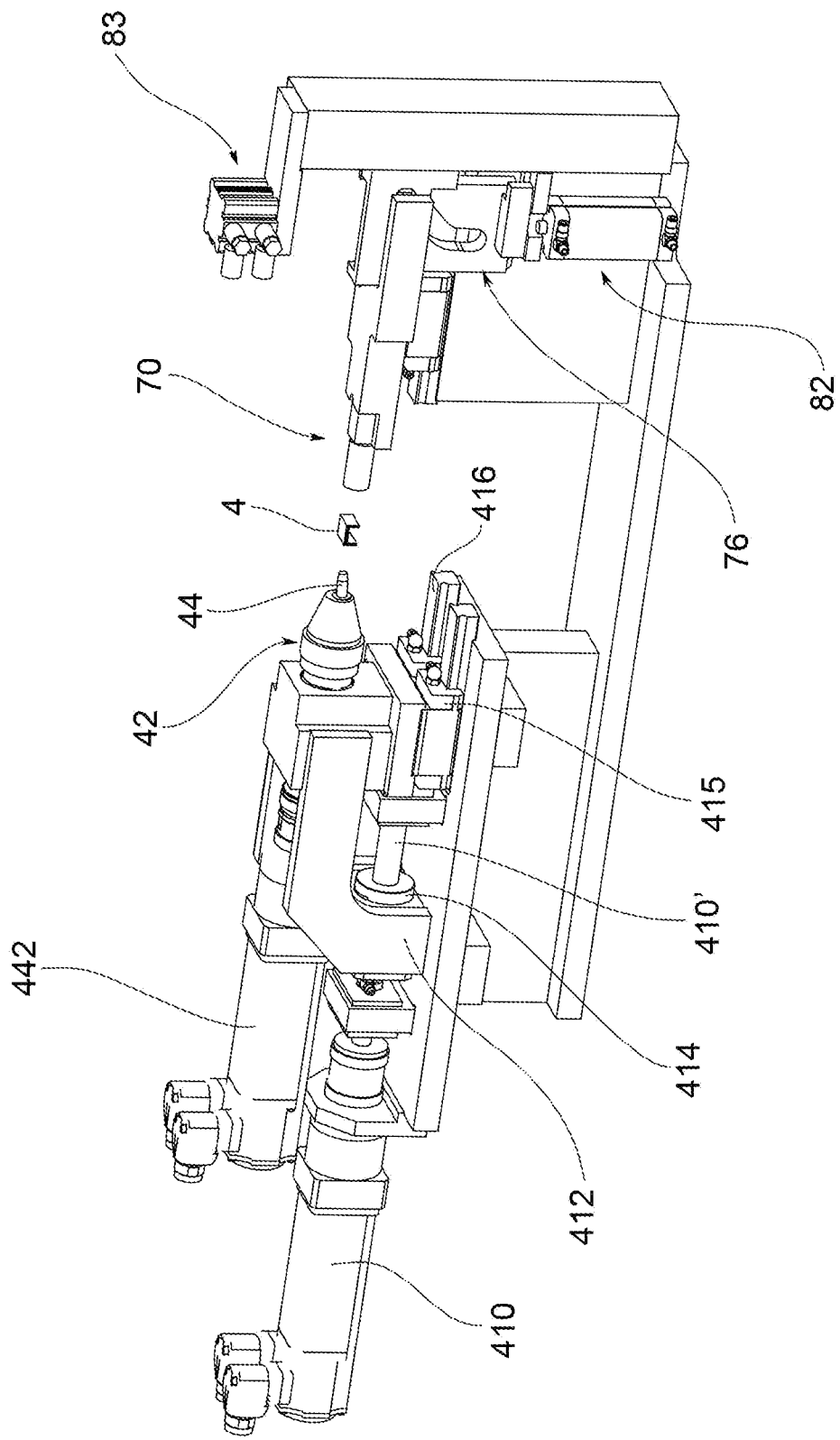
FIG. 4 shows, of a riveting apparatus of the preceding figures, only the riveting and abutment groups in a different embodiment.
Figure 5:
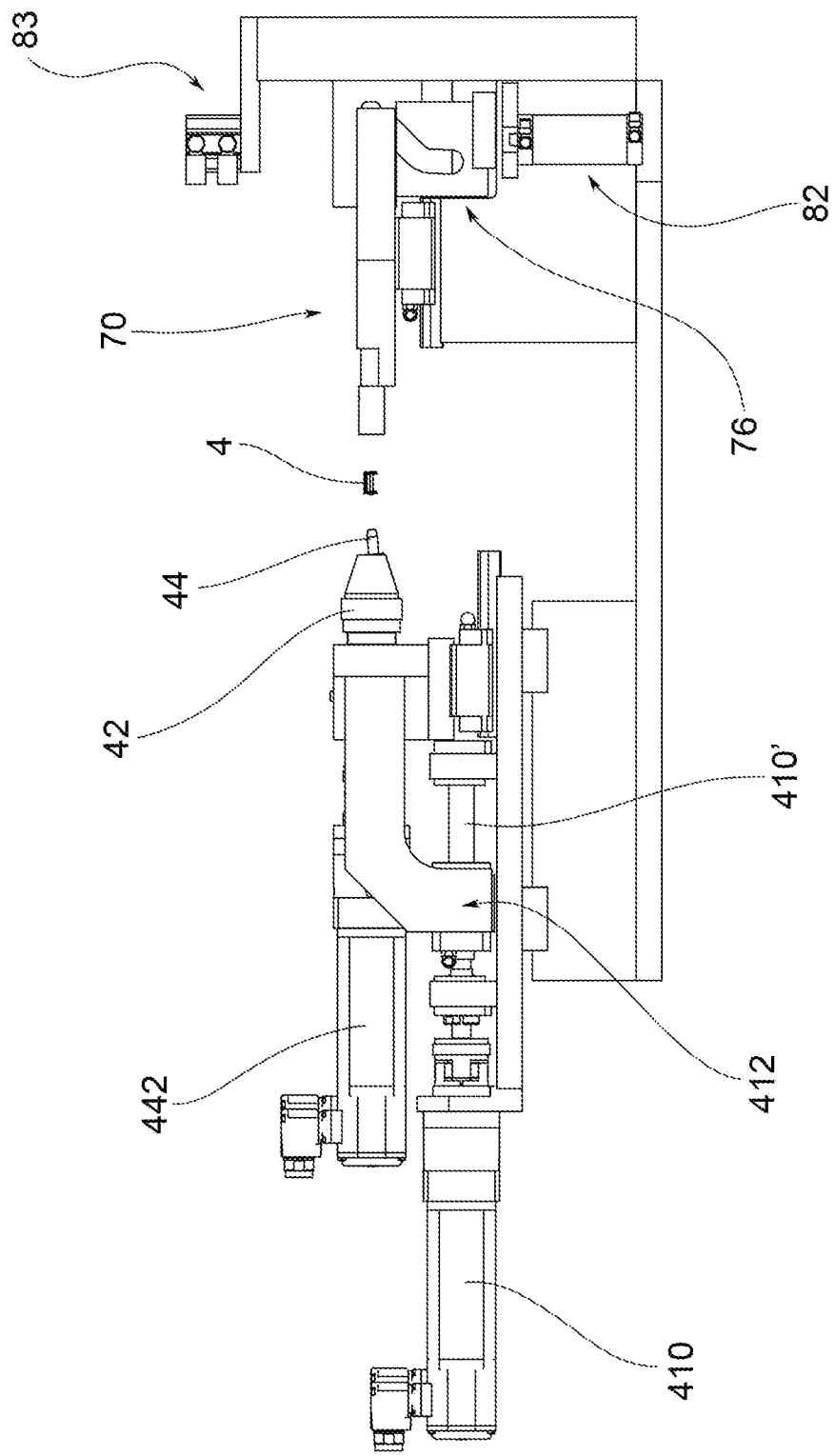
FIGS. 5 to 8 show a front view of the riveting group and the abutment group of FIG. 4, in the rest, contrast, approach and riveting positions, respectively.

With reference to the embodiment in FIGS. 2 and 3, a riveting apparatus 10 comprises a support frame 12 comprising a base 14, resting on a horizontal ground plane T, a first vertical shoulder 16 and a second vertical shoulder 18, supported by base 14 and protruding vertically therefrom, and preferably at least at least one crosspiece 20, which superiorly joins said vertical shoulders panels 16, 18.

The frame thus forms a closed-loop structure, crossed by a transport system, such as a conveyor belt 92 movable along an advancement direction X.

Moreover, the riveting apparatus 10 comprises a rivet insertion device 30 and a riveting device 40, mutually integrated.

In other words, the rivet insertion device 30 and the riveting device 40 share certain structural parts and provide coordinated functionalities. In addition, preferably, they are both supported by base 14.

The riveting apparatus 10 comprises a longitudinal guide 50, having extension along a longitudinal direction U, oriented along the advancement direction X (for example, parallel thereto), arranged integral with the base or with one of the two shoulders 16, 18, for example with the first vertical shoulder 16.

The riveting apparatus 10 further comprises a mobile support 52 slidably engaged with the longitudinal guide 50, and first movement means, for example pneumatic, adapted to move the mobile support 52 on said longitudinal guide 50 along the longitudinal direction U.

The insertion device 30 comprises a picking group 32 adapted to accompany the insertion of rivet 6 into hole 4a, arranged on board the mobile support 52.

In particular, to this end, the picking group 32 comprises a picking rod 34 having extension and translatable along a picking direction Z1.

The riveting device 40 instead comprises a riveting head 42 suitable to plastically deform the free end of rivet 6, also placed on board the mobile support 52, longitudinally flanking the picking group 32.

The riveting head 42 is translatable along a riveting direction Z2 orthogonal to the advancement direction X and comprises a rotatable riveting tip 44, intended to come into contact with the free end of rivet 6.

In an embodiment illustrated in FIGS. 4-8, for translating the riveting head 42 along the riveting direction Z2, the riveting device 40 is provided with a first electric motor 410, for example a brushless motor.

In an embodiment, the riveting head 42 is supported by a support bracket 412 coupled in translation to the driving shaft 410' of the first electric motor 410 through a screw-nut system 414.

For example, the riveting head 42 moves thanks to one or more carriages 415 slidably coupled on one or more anti-rotation guides 416 and integral with the nut screw so as to transform the rotation of the motor shaft into a translation of the support bracket 412.

Preferably, the tip 44 has an extension along a tip axis Q, coincident with the axis of rotation, tilted with respect to the riveting translation direction Z2 of head 42.

According to an embodiment variant, the tip has a projection at the end, preferably rounded, suitable for being at least partially inserted into the rivet slit.

In one embodiment, the tip 44 is moved in rotation by a second electric motor 442, for example placed above the first electric motor 410.

In addition, the riveting apparatus 10 comprises a secondary transverse guide 54, having extension along a transverse direction J1 orthogonal to the advancement direction X, placed on board the mobile support 52 and on which is the picking group 32 is placed, and second movement means, such as pneumatic, suitable for moving the picking group 32 along said transverse direction J1 for a movement of approach of the picking group 32 to article 1a, 1b being processed.

The riveting apparatus 10 further comprises a rivet feed group 60, such as supported by the second vertical shoulder 18.

The riveting apparatus 10 further comprises a primary transverse guide 56, having extension along a transverse direction J2 orthogonal to the advancement direction X, on which the rivet feed group 60 is slidably engaged, and third movement means, such as pneumatic, suitable for moving the rivet feed group 60 to approach it to article 1a, 1b being processed.

The rivet feed group 60 comprises a tubular conduit 62 and a jaw group 64 placed at the end of the tubular conduit 62; the rivets are fed in succession to the tubular conduit 62 and pneumatically, they are pushed individually into the jaw group 64.

The jaw group 64 comprises a pair of elastic jaws 66 that clamp the rivet and arrange it so that shank 6b is aligned along an insertion direction Z3 orthogonal to the advancement direction X.

Figure 9:
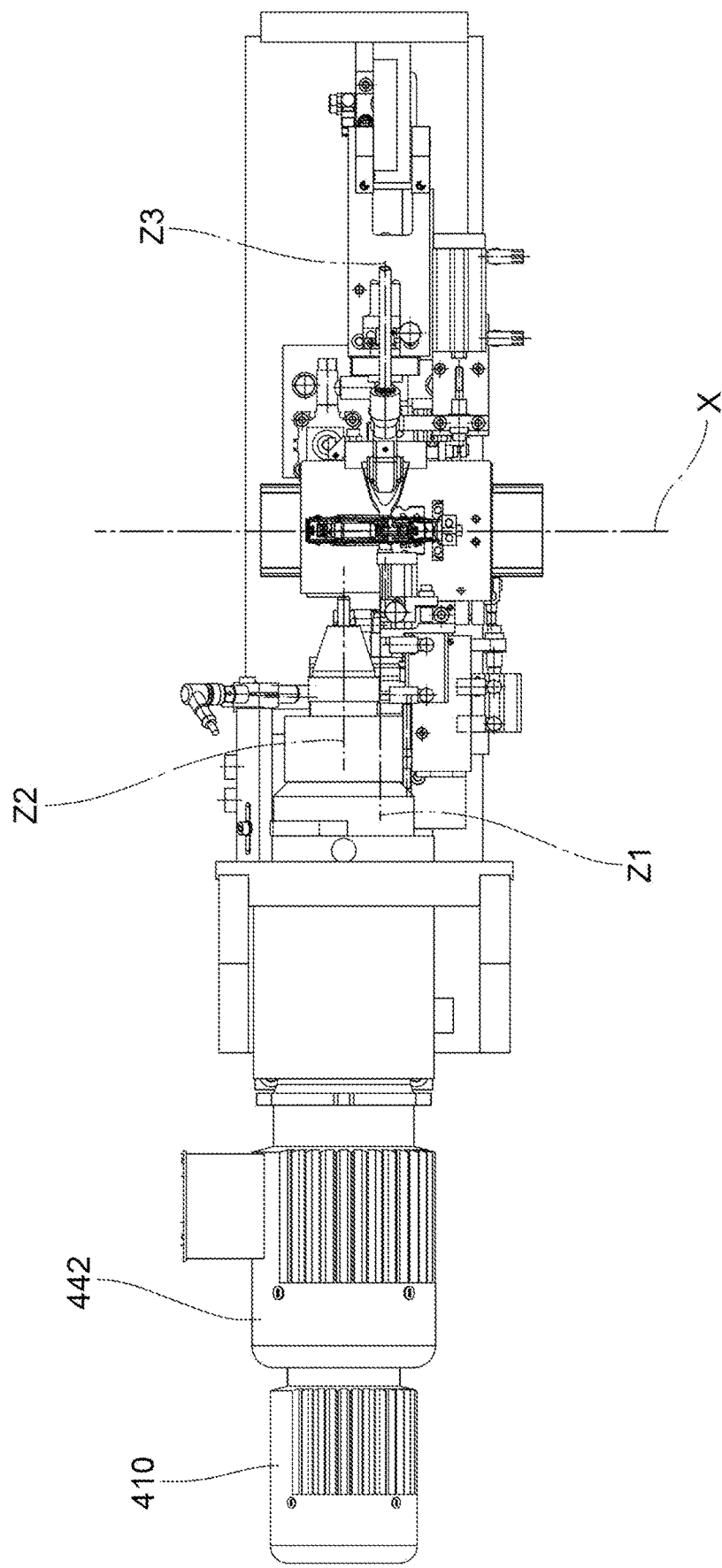
FIG. 9 shows a top plan view of the riveting apparatus in a rivet insertion configuration.

The riveting apparatus 10 is suitable for switching from a rivet insertion configuration to a riveting configuration. In the rivet insertion configuration (FIG. 9), support 52 is in a first longitudinal position, such that the picking axis Z1 is aligned with the insertion axis Z3; in the riveting configuration, support 52 is in a second longitudinal position, such that the riveting axis Z2 is aligned with the insertion axis Z3.

Moreover, the riveting apparatus 10 comprises an insertion and abutment group 70 cooperating with the rivet feed group 60 for inserting the rivet into hole 4a of article 1b and with the riveting head 42 for riveting said rivet.

The insertion and abutment group 70 comprises a main rod 72 coaxial to the insertion direction Z3 and translatable along said direction Z3. In particular, the main rod 72 crosses the jaw group 64 and faces towards the region between said jaw group 64 and said picking group 32.

Figure 15:
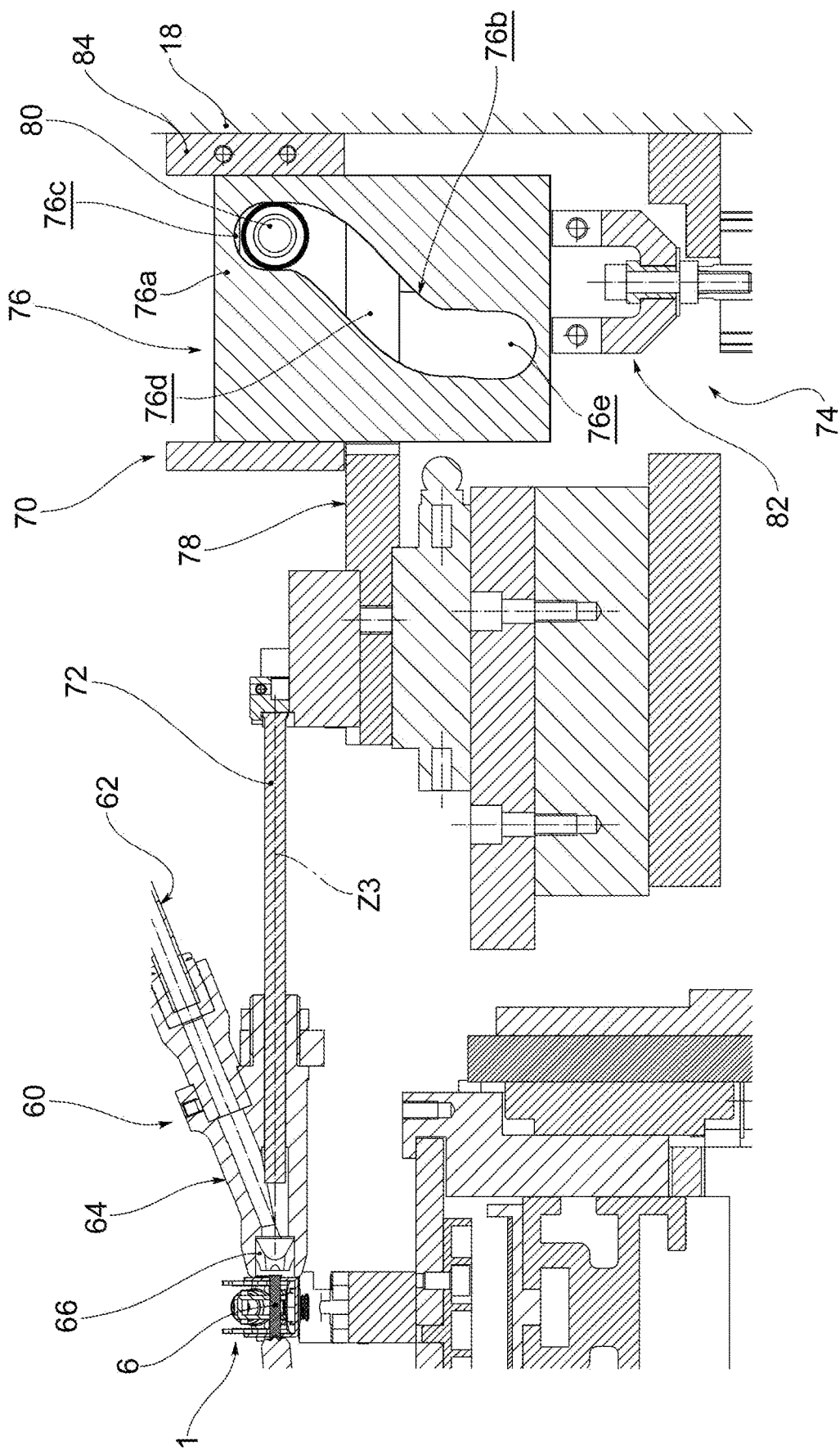
FIG. 15 shows an insertion and abutment group of the apparatus, in a configuration in which a cam is in a first limit position.
Figure 16:
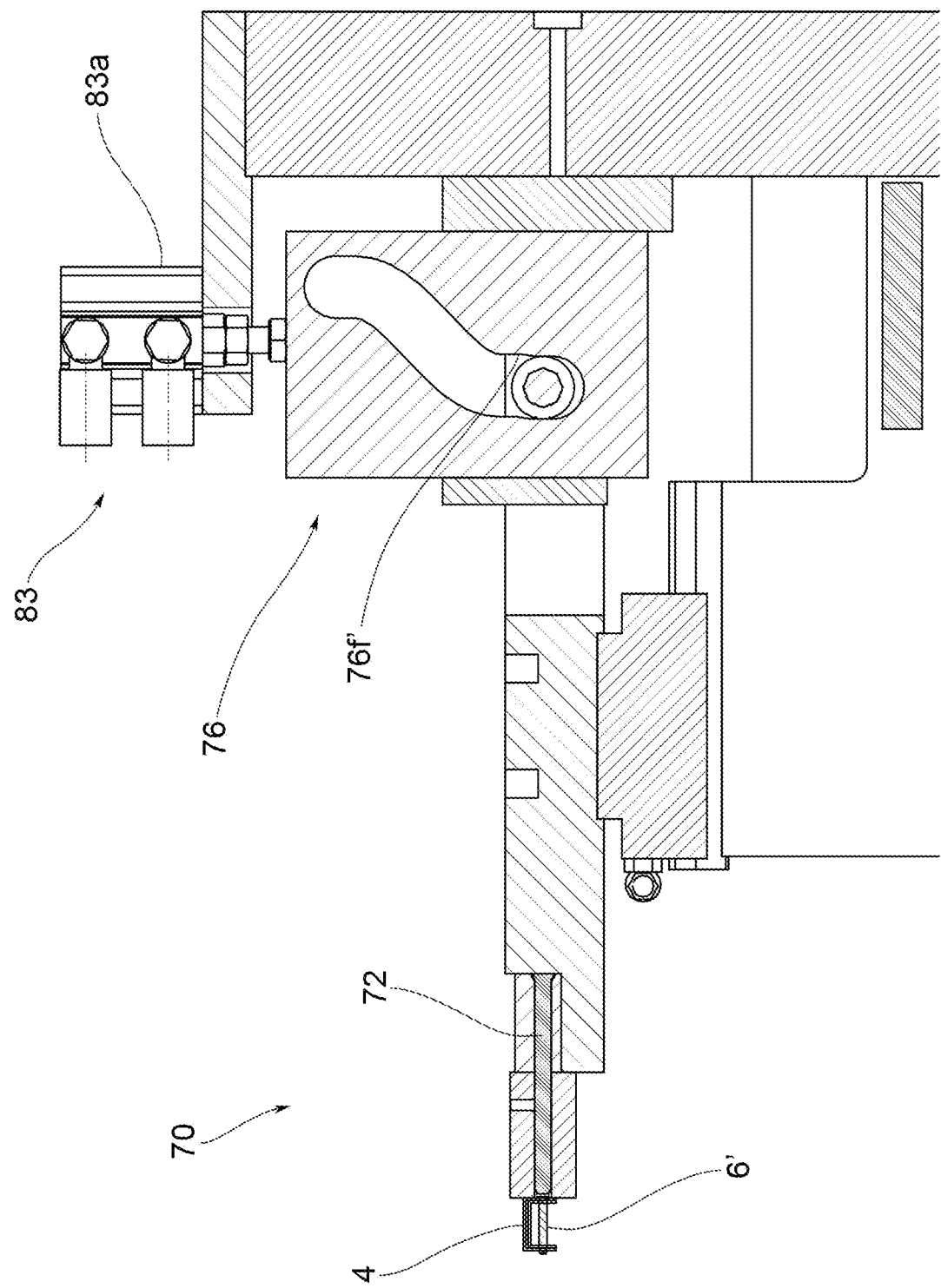
FIG. 16 shows the insertion and abutment group of the apparatus, in a configuration in which the cam is in a second limit position.
Figure 17:
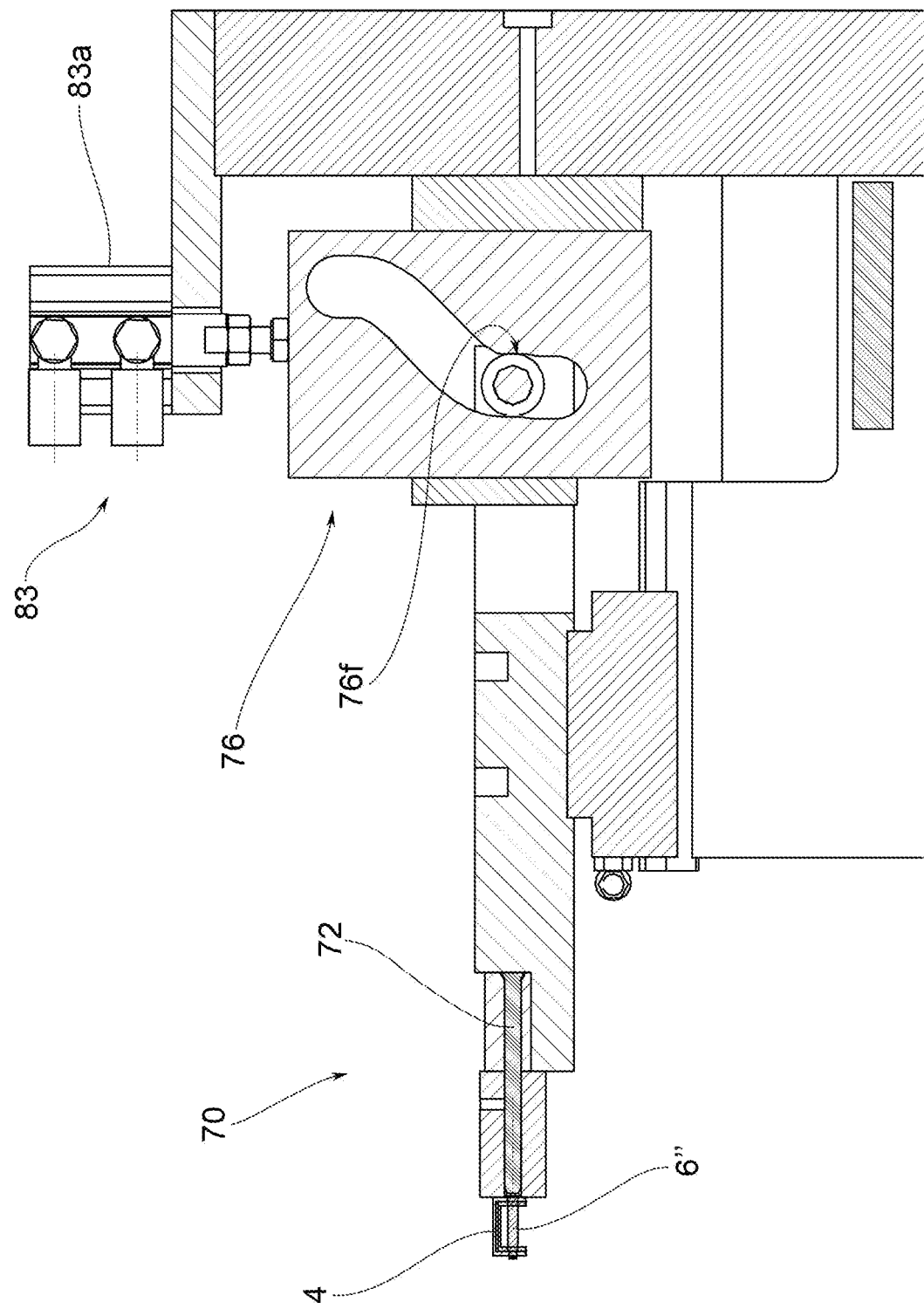
FIG. 17 shows the insertion and abutment group of the apparatus, in a configuration in which the cam is in an intermediate position.

According to FIGS. 15-17, in order to move the main rod 72, the insertion and abutment group 70 comprises movement means.

For example, said movement means comprise a cylinder-piston group.

According to a preferred embodiment, said movement means are cam movement means 74.

Preferably, said cam movement means 74 comprise a cam 76 and a driven body 78, having an engagement element 80 slidably engaged with cam 76 and integral in translation with the main rod 72.

Moreover, the cam movement means 74 comprise actuation means 82, such as pneumatic, for moving cam 76. Preferably, said actuation means are suitable for moving cam 76 vertically.

For example, cam 76 is translatable between a first limit position, such as lowered, which corresponds to a retracted limit position of the main rod 72 (FIG. 15) and a second limit position, such as raised, which corresponds to an advanced limit position of the main rod (FIG. 16).

Moreover, cam 76, in the direction orthogonal to the insertion direction Z3, is in abutment with a fixed shoulder 84, for example with the vertical shoulder 18.

For example, said insertion and abutment group 70 comprises a shoulder 84, with which the cam is in contact and vertically slidable.

Preferably, cam 76 consists of a cam body 76a, on which a groove 76b is formed in which the engagement element 80 moves integral with the main rod 72.

The shape of groove 76b determines the movement features of the main rod 72.

In particular, groove 76b comprises an upper limit compartment 76c, in which the engagement element 80 is accommodated when the cam is in the first limit position, an intermediate tilted stretch 76d and a lower limit compartment 76e, in which the engagement element 80 is accommodated when the cam is in the second limit position.

The lower limit compartment 76e is delimited in the insertion direction Z3, at the front, by an abutment wall 88 of the cam body 76a.

In a preferred embodiment, the groove 76b forms, near the lower limit compartment 76e, an intermediate space 76f adapted to receive the engagement element 80 when the cam body 76a is in an intermediate position (FIG. 17).

In particular, this intermediate compartment 76f has an intermediate compartment centre slightly set back, along the direction Z3, with respect to the lower limit compartment centre of the lower limit compartment 76e.

For example, the intermediate compartment 76f is delimited at least by a concave portion 76f' of the rear wall of the groove 76b.

In this way, it is possible to adapt the insertion and abutment group 70 to rivets 6 of different lengths.

In fact, when the engagement element 80 is in the lower limit compartment 76e, the main rod 72 is in a position of maximum advancement for the abutment of a short rivet 6' (FIG. 16).

When, on the other hand, the engagement element 80 is located in the intermediate compartment 76f, the main rod 72 is in an advanced intermediate position, suitable for abutting a long rivet 6" (FIG. 17).

To lock the cam body 76a in the intermediate position defined above, the insertion and abutment group comprises cam stop means 83 which operate so as to block the movement of translation of the cam 76 operated by the actuation means 82.

For example, such cam stop means 83 comprise a cylinder-piston system 83a, or an electric motor, suitable for making a stop for the cam 76 in its translation from the first limit position to the second limit position.

Figure 10:
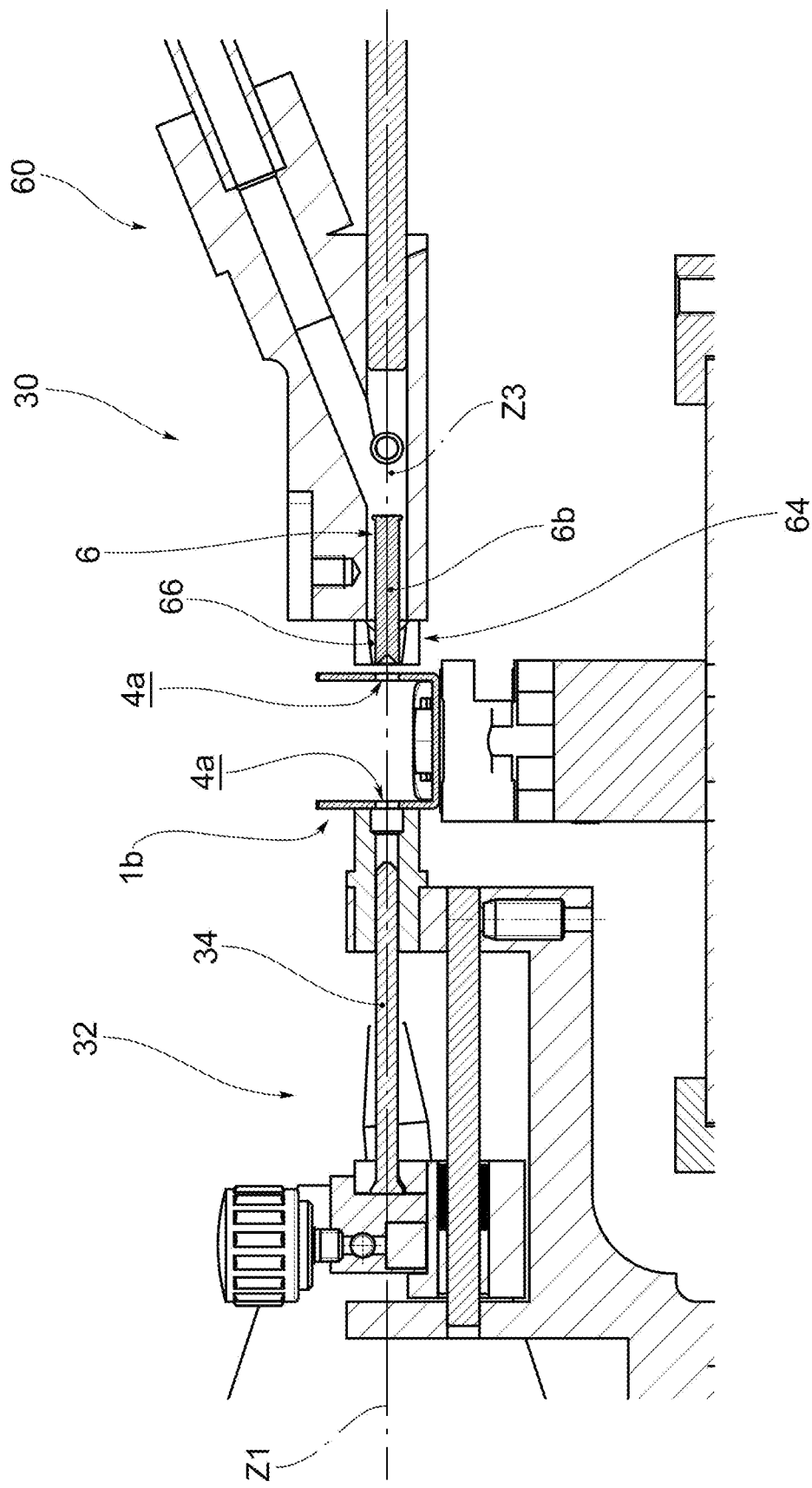
FIGS. 10 to 12 show working steps of the apparatus in the rivet insertion configuration.

In the rivet insertion configuration of the riveting apparatus 10, in an initial configuration of the insertion device 30 (FIG. 10), the picking group 32 is flanked to article 1b being processed, by the actuation of the second movement means that carry out the translation of said picking group 32 along the secondary transverse guide 54, and the picking rod 34 is in an initial retracted position.

At the same time, the rivet feed group 60 is flanked to article 1b being processed by the actuation the third movement means that carry out the translation of said rivet feed group 60 along the primary transverse guide 56 and rivet 6 to be assembled is picked by the jaw group 64, so that shank 6b is aligned in the insertion direction Z3.

The main rod 72 of the insertion and abutment group rear is in a retracted limit position, in which it does not engage rivet 6. Therefore, cam 76 is the first limit position (FIG. 15).

Figure 11:
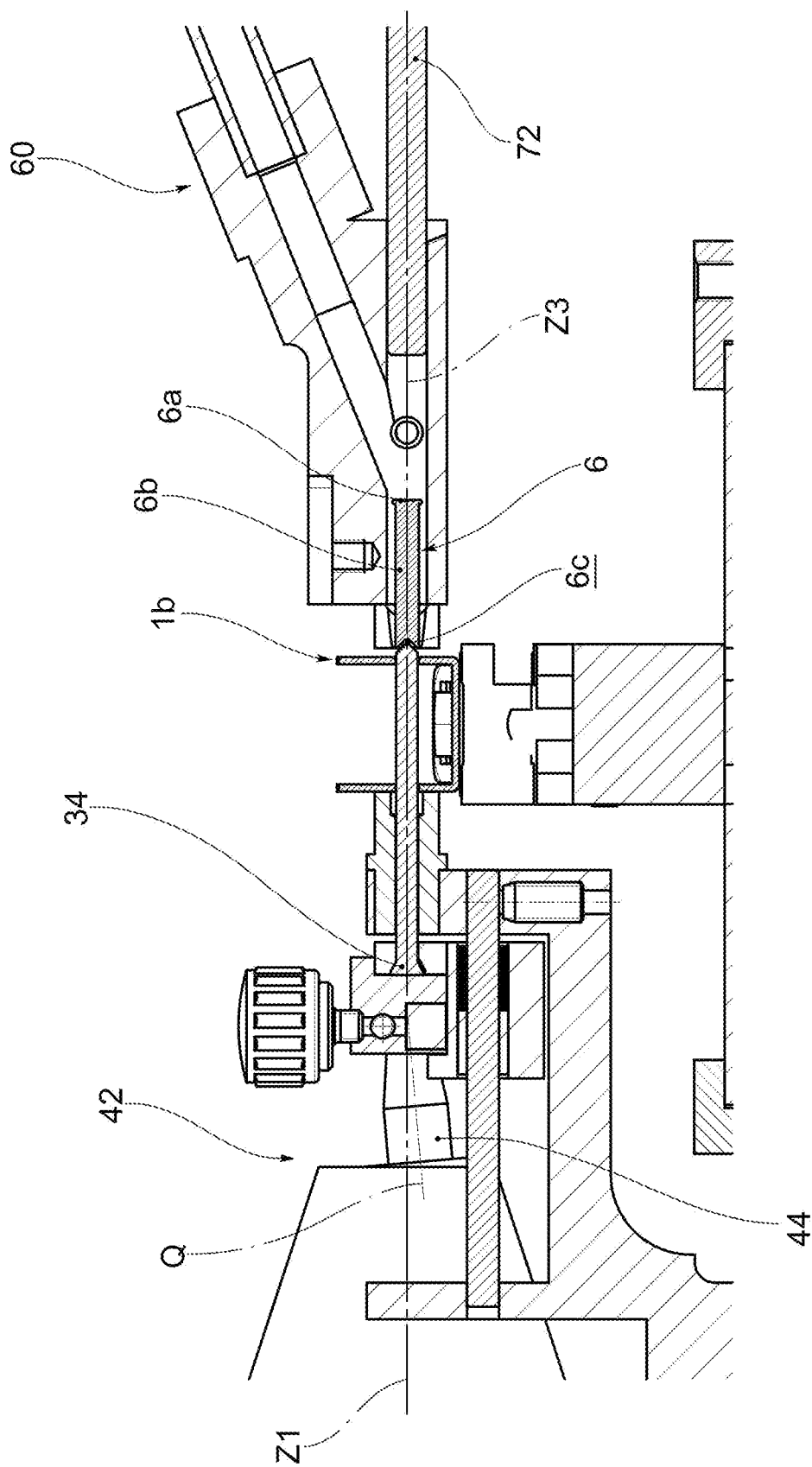

In a subsequent picking start configuration of the insertion device 30 (FIG. 11), the picking rod 34 is translated to an advanced limit position, in which it crosses the region in which article 1b is, in particular so as to cross hole 4a and engage rivet 6 on the other side, particularly fitting into slit 6c thereof.

Figure 12:
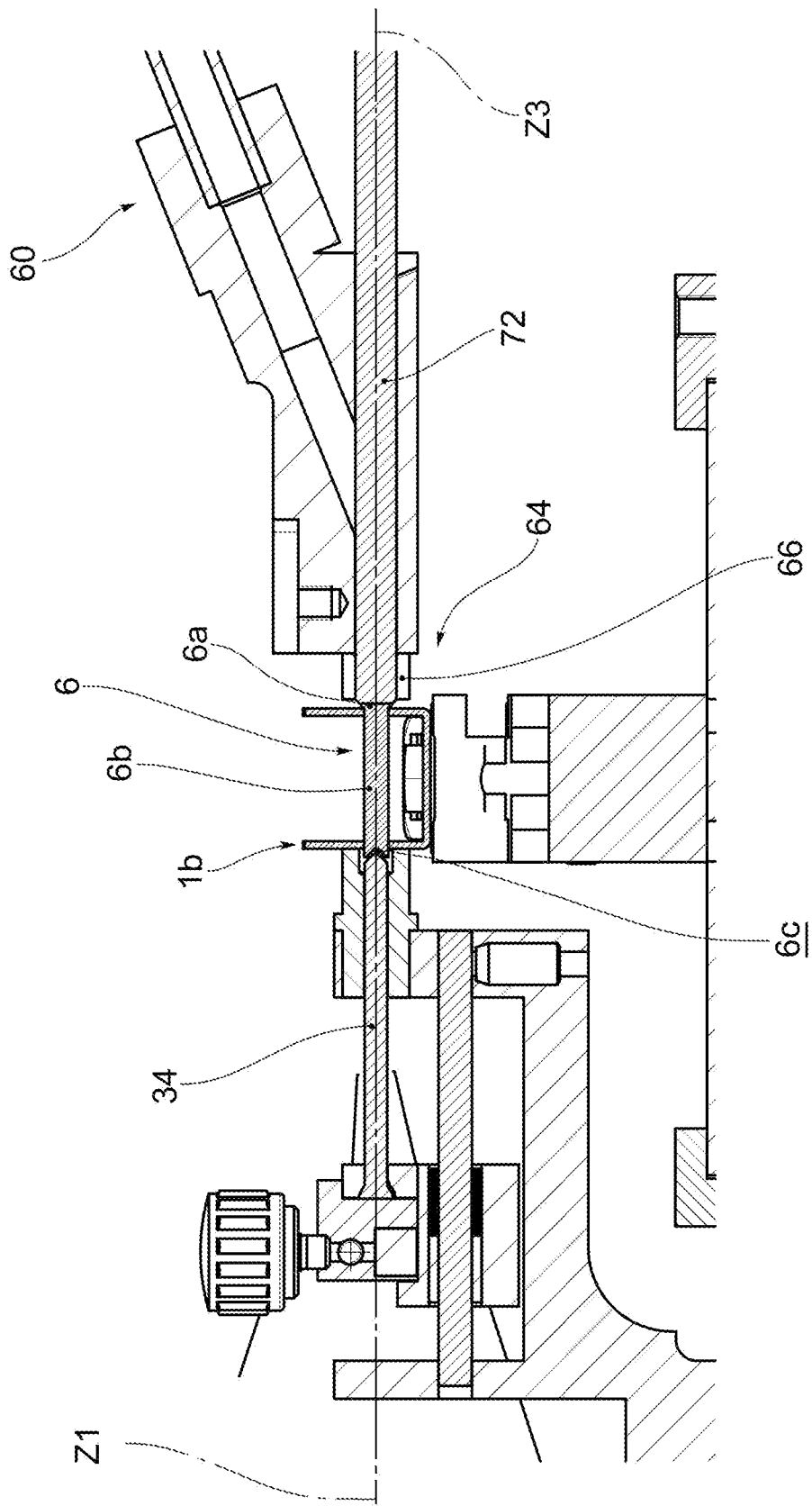
Figure 13:
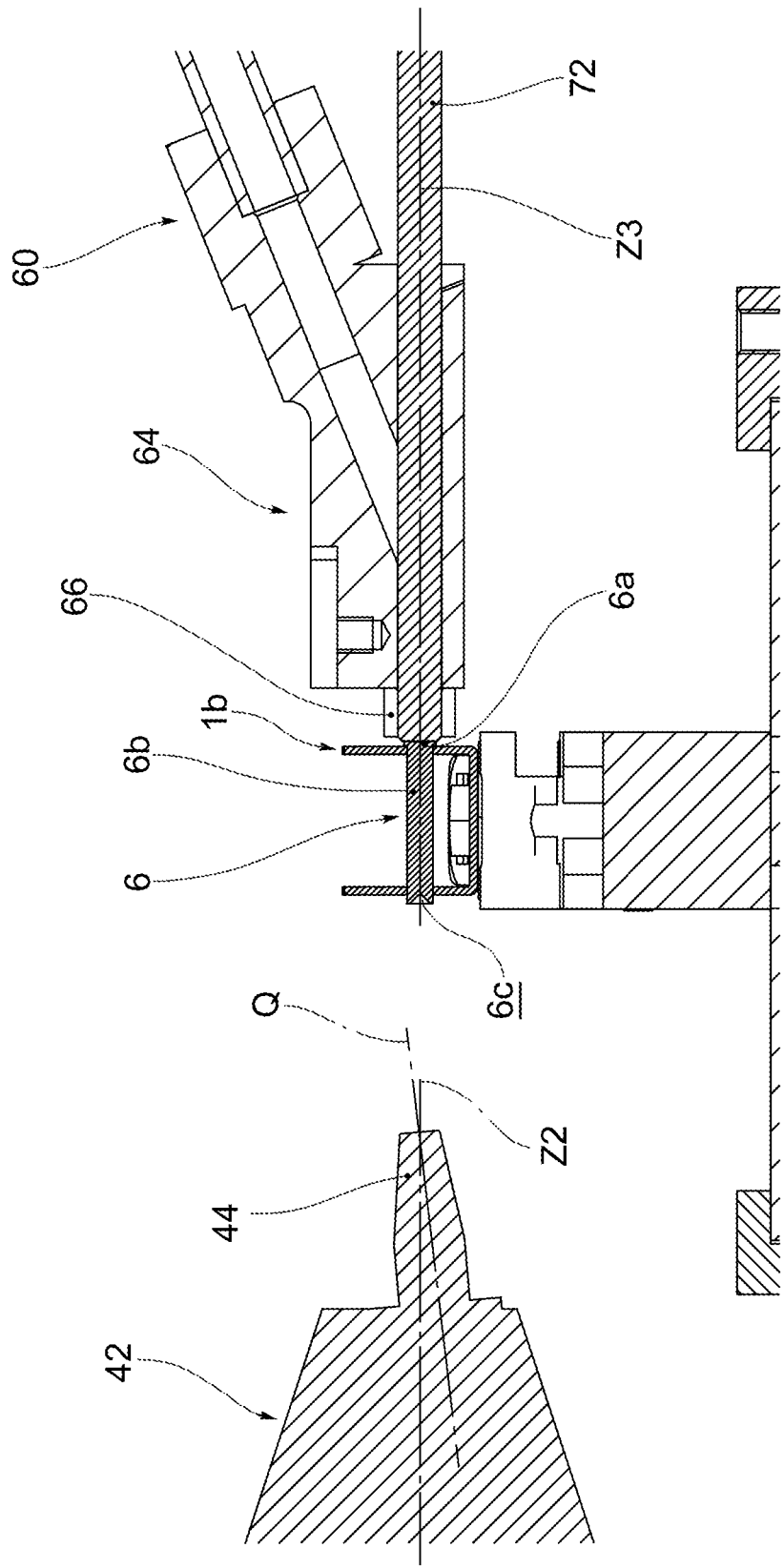
FIGS. 13 and 14 show working steps of the apparatus in the riveting configuration.
Figure 14:
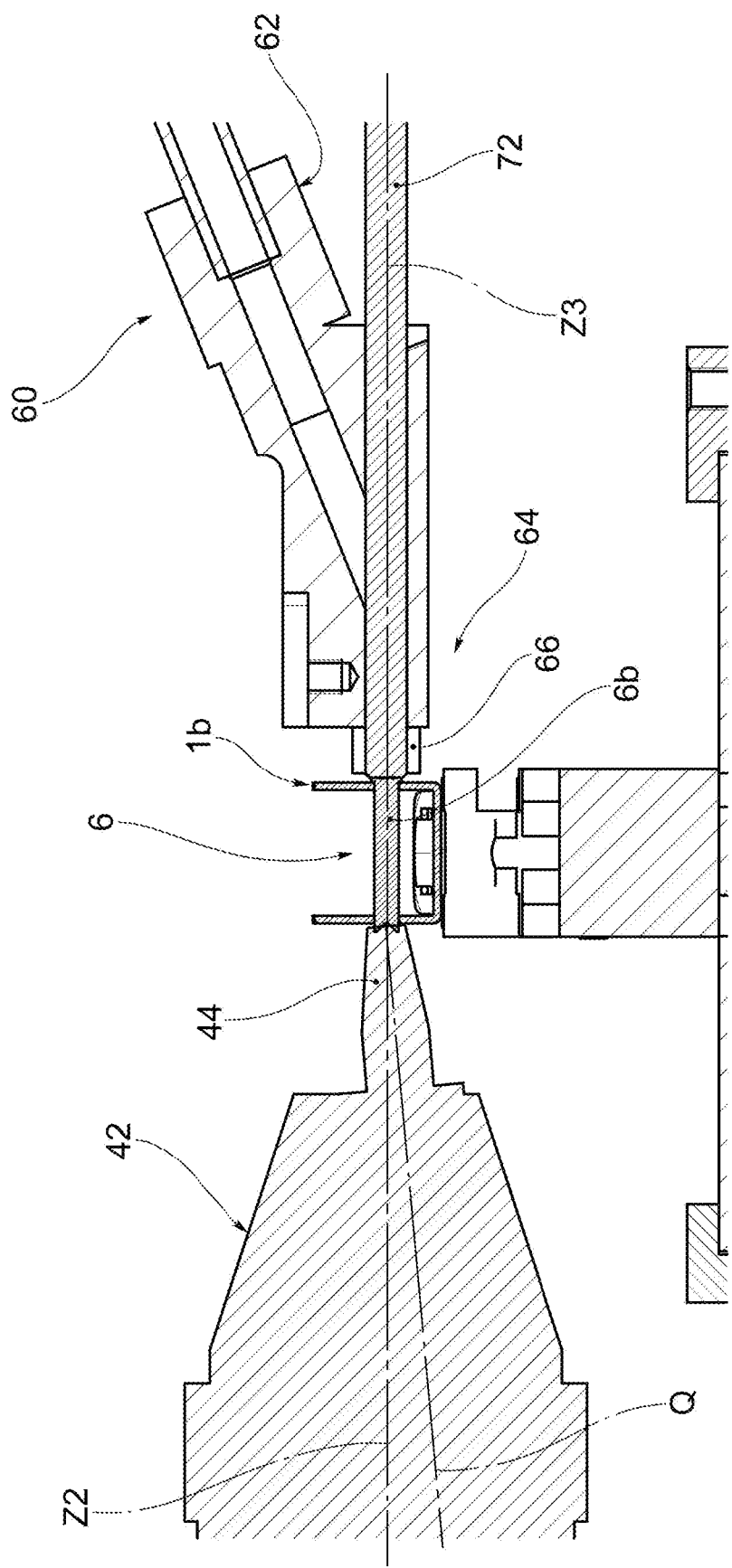

In a subsequent picking configuration of the insertion device 30 (FIG. 12), the main rod 72 is translated to an advanced limit position or to the advanced intermediate position, depending on the length of the rivet 6, and the picking rod 34 simultaneously retracts towards the retracted limit position.

Rivet 6 is thus pushed by the main rod 72 which crossing the jaw group 64 widens jaws 66, allowing the passage of head 6a of rivet 6, and the simultaneously accompanied through hole 4a by the picking rod 34, engaged into slit 6c.

Due to the translation of the main rod 72, cam 76 is brought to the second limit position (FIG. 16) or to the intermediate position (FIG. 17).

Preferably, the riveting apparatus comprises means for measuring the length of the rivet suitable to provide a measure of the length of the rivet.

According to an embodiment, said measurement means comprise an electronic device for detecting the stroke of the picking rod, an electronic device for detecting the stroke of the main rod and a processing device, operationally engaged with said electronic devices. The electronic device for detecting the stroke of the picking rod detects the forward stroke and the return stroke of the rod, while the electronic device for detecting the stroke of the main rod detects the forward stroke of the main rod. Knowing the distance between the initial retracted position of the picking rod 34 and the limit retracted position of the main rod 72 (which is a constructive parameter), the rivet length can be calculated as a function of the forward stroke of the picking rod, of the return stroke of the picking rod and of the forward stroke of the main rod.

Subsequently, the riveting apparatus 10 switches to the riveting configuration, in which support 52 is in the second longitudinal position, so that the riveting axis Z2 is aligned with the insertion axis Z3.

In the riveting configuration of apparatus 10, in an initial rest configuration (FIG. 5), the riveting head is in a retracted limit position, in which it is spaced apart from the region in which article 1b is, and specifically spaced from the end of rivet 6.

Figure 6:
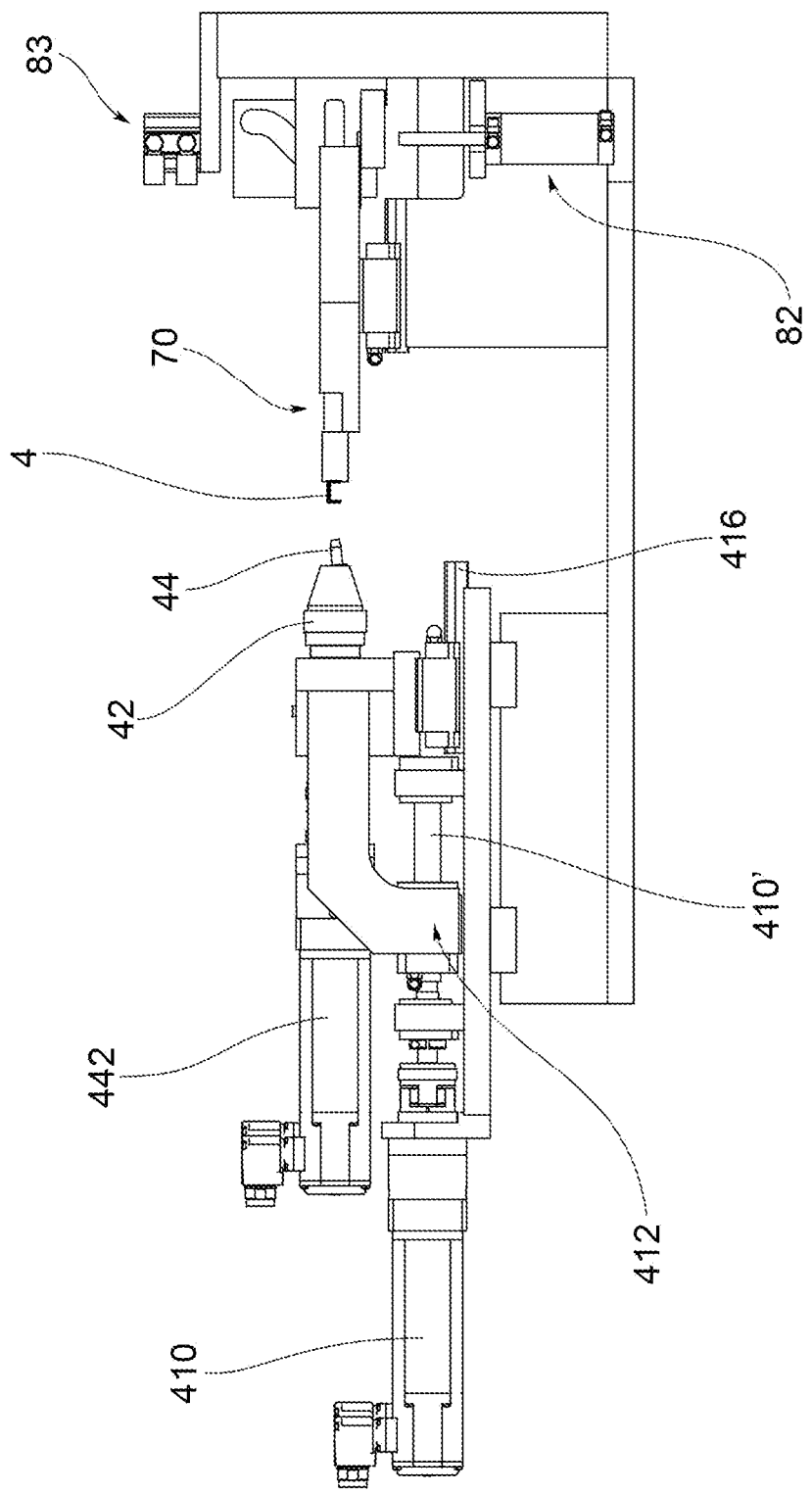
Figure 7:
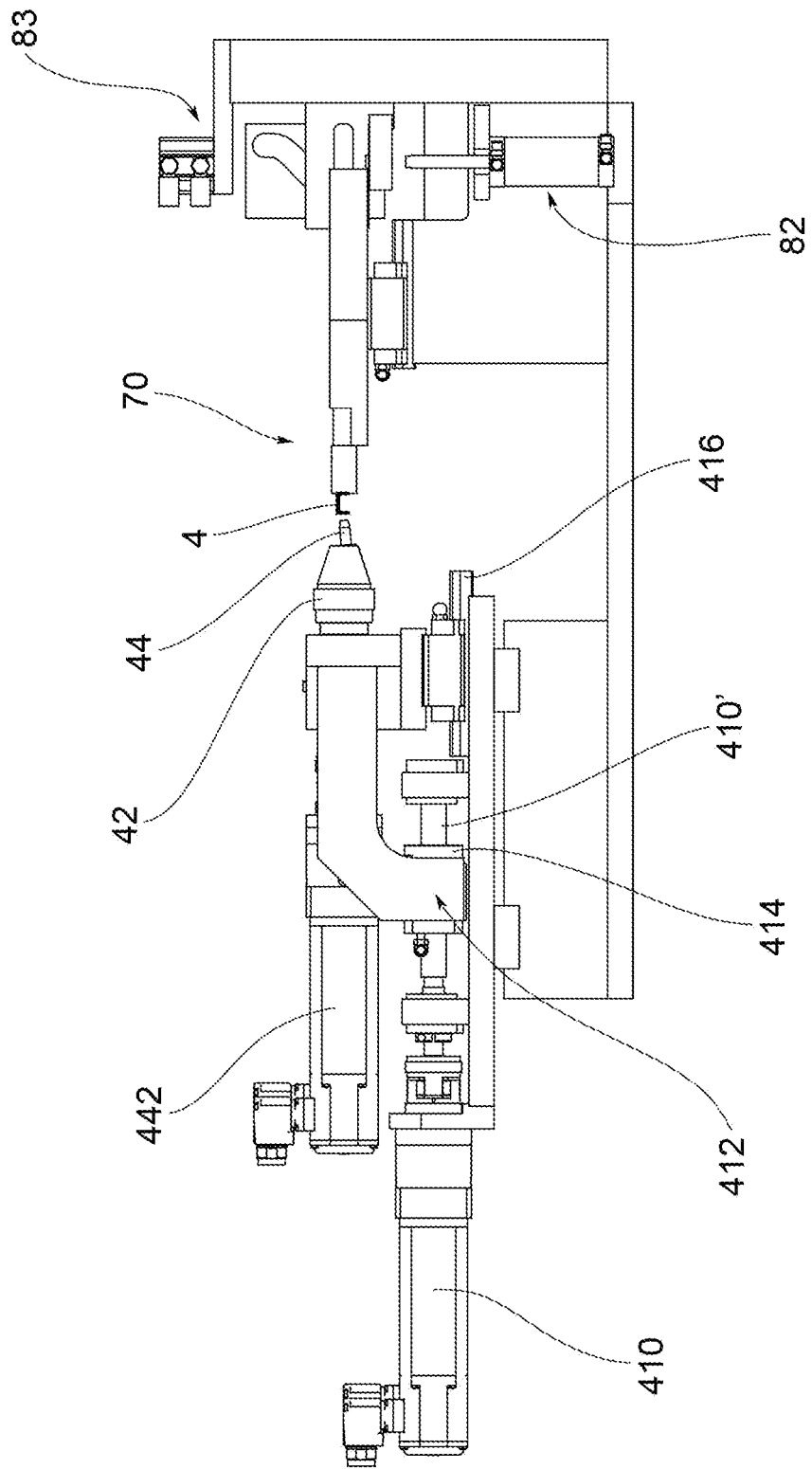

The main rod 72 remains or, if previously pushed back, is advanced to the advanced limit position or to the advanced intermediate position, defined by the cam 76 in the second limit position or in the intermediate position, respectively (FIG. 6).

In a subsequent riveting operating configuration (FIGS. 7 and 8), the riveting head 42 is controlled to translate by the first electric motor 410 to an advanced limit position, in which it rotates thanks to the second electric motor 442 and plastically deform the end of rivet 6, thereby performing the riveting.

Figure 8:
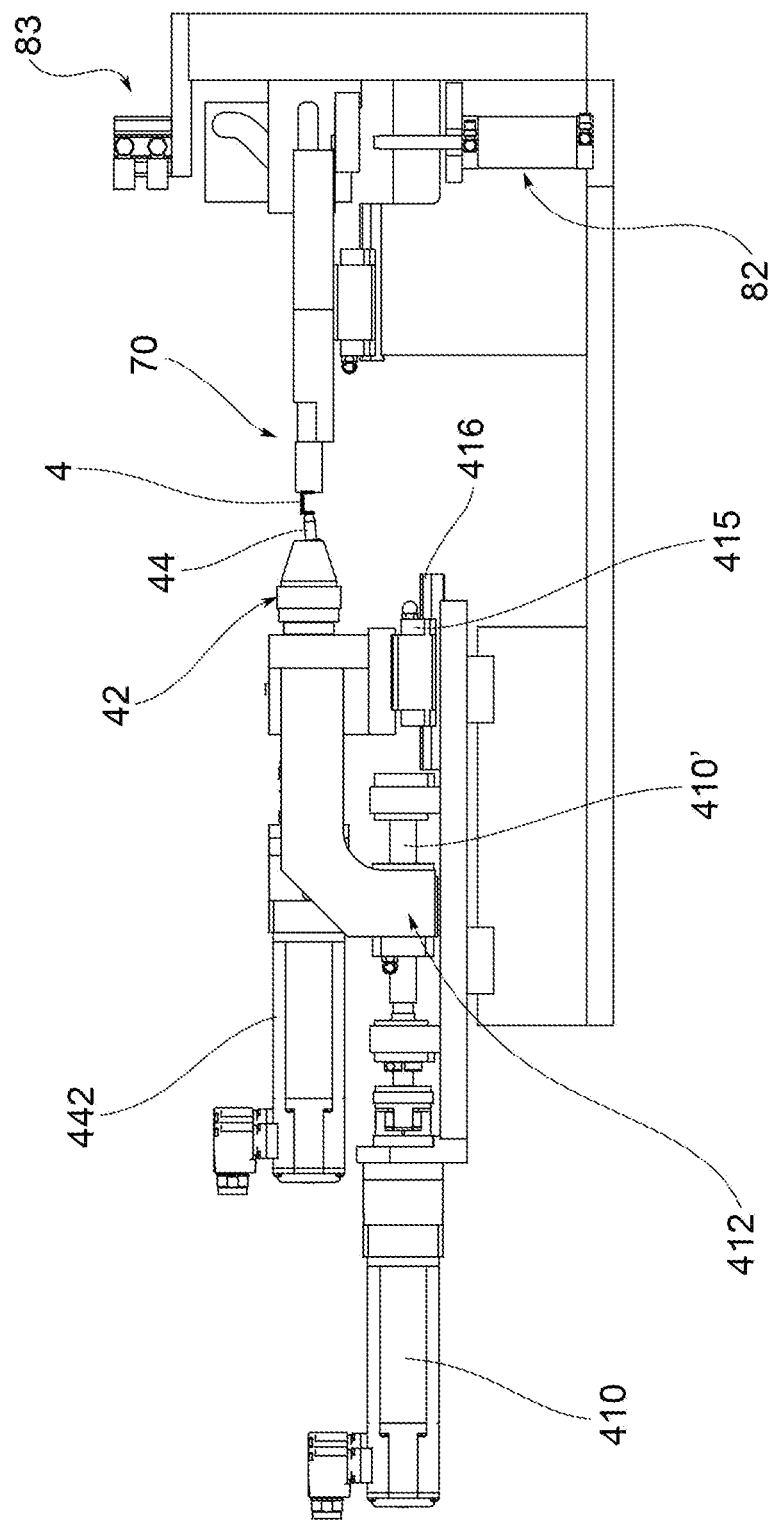

For example, the riveting head 42 performs a first fast approaching stroke up close to the free end of the rivet (FIG. 7), to then abut against such an end more slowly and therefore precisely (FIG. 8).

During the crushing of the end of the rivet, head 6a of rivet 6 is in abutment against the main rod 72, which thus acts as an abutment.

In particular, the action exerted by the riveting head 42 on rivet 6 for riveting is axially transmitted to the main rod 72 and hence to the fixed abutment, such as the vertical shoulder 18, through the driven body 78, the abutment wall 88 of the cam body 76a and preferably, shoulder 84.

Alternatively, the cylinder-piston group of the movement means forms an abutment for the main rod.

Preferably, the riveting apparatus comprises means for measuring the hardness of the rivet suitable to provide a measure of the hardness of the rivet.

According to an embodiment, said rivet hardness measurement are suitable for expressing a measure of hardness as a function of the riveting time with the same number of revolutions of the riveting tip or as a function of the current absorbed by the riveting head.

According to a further embodiment, said rivet hardness measurement means comprise a load cell which detects the compression action acting on the rivet.

Innovatively, the riveting apparatus according to the present invention overcomes the drawbacks of the prior art as it allows performing rivet insertion and riveting operations at high speed and with excellent accuracy.

In particular, the use of an electric motor, preferably brushless, for the translation of the riveting head allows very low cycle times to be obtained, without compromising the reliability of the riveting apparatus and the precision of the operation. In fact, the electric motor allows a very fast stroke to approach the rivet, and a subsequent slower stroke up to the rivet.

The electric motor allows operating with wider tolerances, thanks to the possibility of electronically setting the riveting head stroke according to the tolerances on the dimensions of the mechanical components of the machine and on the length of the rivet.

Moreover, the use of electric motors allows controlling the absorbed current and therefore better controlling the riveting operation performed by the tip.

Advantageously, moreover, the apparatus has limited dimensions, due to the integration between the rivet insertion device and the riveting device.

According to a further advantageous aspect, the apparatus is particularly strong and reliable, for example due to the closed-loop structure of the frame or for example due to the abutment of the riveting action against a fixed abutment, such as the vertical shoulder.

According to an even further advantageous aspect, the apparatus has a high productivity, as jams or other stops of the device are infrequent, due for example to the rivet being accompanied during the insertion.

It is clear that a man skilled in the art may make changes to the apparatus described above in order to meet incidental needs, all falling within the scope of protection defined in the following claims.

The invention claimed is:

1. A working method of a riveting apparatus, the working method comprising:
    inserting a rivet in a component of an article being processed, by a picking group having a picking direction and an insertion and abutment group having an insertion direction;
    translating the picking group and translating integrally to the picking group a riveting head having a riveting direction, so as to align the riveting direction to the insertion direction;
    translating the riveting head from an idle position to an advanced riveting position, and
    performing riveting of a free end of the rivet by translation of the riveting head along said riveting direction, by an electric brushless motor, maintaining a main rod of the insertion and abutment group in abutment with a head of the rivet, opposite the riveted end.

2. The working method of claim 1, wherein the electric brushless motor is controlled to make the riveting head perform a first fast approach stroke to the free end of the rivet and a second slower stroke up to abutment against the free end of the rivet.

3. The working method of claim 1, wherein the main rod is moved in translation from an inactive retracted position to one of at least two advanced abutment positions of the rivet head, having different distances from the retracted position, depending on a length of the rivet.

* * * * *